United States Patent
Ozawa

(10) Patent No.: US 9,118,953 B2
(45) Date of Patent: Aug. 25, 2015

(54) REMOTE MOBILE COMMUNICATION SYSTEM, SERVER DEVICE, AND REMOTE MOBILE COMMUNICATION SYSTEM CONTROL METHOD

(75) Inventor: Kazunori Ozawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 310 days.

(21) Appl. No.: 13/697,716

(22) PCT Filed: May 9, 2011

(86) PCT No.: PCT/JP2011/060648
§ 371 (c)(1),
(2), (4) Date: Nov. 13, 2012

(87) PCT Pub. No.: WO2011/142312
PCT Pub. Date: Nov. 17, 2011

(65) Prior Publication Data
US 2013/0058213 A1 Mar. 7, 2013

(30) Foreign Application Priority Data
May 10, 2010 (JP) ................................. 2010-108669

(51) Int. Cl.
*G01R 31/08* (2006.01)
*H04N 21/414* (2011.01)
*H04N 21/2343* (2011.01)
(Continued)

(52) U.S. Cl.
CPC ...... *H04N 21/41407* (2013.01); *H04L 65/4084* (2013.01); *H04L 65/80* (2013.01); *H04N 21/2343* (2013.01); *H04N 21/234309* (2013.01); *H04N 21/25825* (2013.01); *H04N 21/274* (2013.01); *H04N 21/6375* (2013.01);
(Continued)

(58) Field of Classification Search
CPC .. H04W 4/18; H04L 67/2842; H04L 67/2852
See application file for complete search history.

(56) References Cited

U.S. PATENT DOCUMENTS 7,962,124 B1 * 6/2011 Bharatia et al. ............ 455/412.1
8,527,647 B2 * 9/2013 Gopalakrishnan ............ 709/231
(Continued)

FOREIGN PATENT DOCUMENTS

| JP | 10-336238 | 12/1998 |
|---|---|---|
| JP | 2002-245259 | 8/2002 |

(Continued)

OTHER PUBLICATIONS

JP Office Action dated Oct. 29, 2013, with English Translation; Application No. 2012-514786.
(Continued)

*Primary Examiner* — Phirin Sam
(74) *Attorney, Agent, or Firm* — Young & Thompson

(57) ABSTRACT

A server device includes: a storage unit that, upon receiving content storage instruction information from a mobile terminal via a packet forwarding device in a mobile network and a content stream or content file, stores the content stream or content file; a virtual client unit that, upon receiving content reproduction instruction information from the mobile terminal, reads, decodes and reproduces a content stream or content file stored in the storage unit to generate display screen data; and an encoder unit that transmits an encoding result obtained by compression-encoding part or all of the display screen data as a packet to the packet forwarding device.

17 Claims, 5 Drawing Sheets

(51) Int. Cl.
  *H04N 21/258* (2011.01)
  *H04N 21/274* (2011.01)
  *H04N 21/6375* (2011.01)
  *H04L 29/06* (2006.01)
  *H04W 4/18* (2009.01)
  *H04W 28/04* (2009.01)
  *H04W 28/06* (2009.01)

(52) U.S. Cl.
  CPC ............... *H04W 4/18* (2013.01); *H04W 28/04* (2013.01); *H04W 28/06* (2013.01)

(56) References Cited

U.S. PATENT DOCUMENTS

| | | | |
|---|---|---|---|
| 2003/0120747 A1* | 6/2003 | Kim | 709/217 |
| 2005/0009505 A1* | 1/2005 | Triebel | 455/411 |
| 2006/0111095 A1* | 5/2006 | Weigand | 455/418 |
| 2006/0253560 A1* | 11/2006 | Aaltonen | 709/223 |
| 2006/0258291 A1 | 11/2006 | Nakata et al. | |
| 2007/0268824 A1* | 11/2007 | Kodaka et al. | 370/229 |
| 2008/0052631 A1* | 2/2008 | Choi et al. | 715/740 |
| 2008/0182552 A1* | 7/2008 | Dinh et al. | 455/408 |
| 2008/0184128 A1* | 7/2008 | Swenson et al. | 715/738 |
| 2008/0189298 A1* | 8/2008 | Cha | 707/10 |
| 2009/0006533 A1* | 1/2009 | Guo | 709/203 |
| 2009/0063038 A1* | 3/2009 | Shrivathsan et al. | 701/207 |
| 2009/0083432 A1* | 3/2009 | Saito et al. | 709/231 |
| 2009/0115839 A1* | 5/2009 | Kodaka | 348/14.11 |
| 2010/0088755 A1* | 4/2010 | Gotare | 726/11 |
| 2011/0202634 A1* | 8/2011 | Kovvali et al. | 709/219 |
| 2011/0230167 A1* | 9/2011 | Bharatia et al. | 455/412.1 |
| 2012/0011271 A1* | 1/2012 | Zhao et al. | 709/234 |
| 2012/0039332 A1* | 2/2012 | Jackowski et al. | 370/389 |
| 2013/0337810 A1* | 12/2013 | Ko et al. | 455/436 |

FOREIGN PATENT DOCUMENTS

| | | |
|---|---|---|
| JP | 2005-006288 | 1/2005 |
| JP | 2005-311842 | 11/2005 |
| JP | 2006-521029 | 9/2006 |
| JP | 2007-310508 | 11/2007 |
| JP | 2007-325109 | 12/2007 |
| JP | 2008-234389 | 10/2008 |
| JP | 2009-060425 | 3/2009 |
| JP | 2009-246758 | 10/2009 |

OTHER PUBLICATIONS

International Search Report, PCT/JP2011/060648, Jun. 14, 2011.
Japanese Official Action—2012-514786—Aug. 13, 2013.
Virtual desktop solution realized base on Citrix technology, Nikkei Computer, JAPAN, Nikkei BP Publishing, Sep. 30, 2009, vol. 740, pp. 118-122.

* cited by examiner

REMOTE MOBILE COMMUNICATION SYSTEM, SERVER DEVICE, AND REMOTE MOBILE COMMUNICATION SYSTEM CONTROL METHOD

CROSS-REFERENCE TO RELATED APPLICATIONS

This application is based upon and claims the benefit of the priority of Japanese patent application No. 2010-108669 filed on May 10, 2010, the disclosure of which is incorporated herein in its entirety by reference thereto.

TECHNICAL FIELD

The present invention relates to a remote mobile communication system, server device, and remote mobile communication system control method, and particularly to a remote mobile communication system, thin client server device, and remote mobile communication system control method that access a virtual client on a server via a mobile network, and that instruct and operate the virtual client as if it were their own terminal.

BACKGROUND

It is expected that new services utilizing high-speed and high-capacity networks will be provided in the near future as the development of high-speed and high-capacity mobile networks progresses due to the introduction of LTE (Long Term Evolution) and EPC (Evolved Packet Core) technologies.

Patent Literature 1 describes a thin client system that can be used in both local and remote environments with simple configurations.

Further, Patent Literature 2 describes a method that optimizes a rate control scheme by exchanging signaling information in a mobile network.

Further, Patent Literature 3 describes a color image data transfer system having optimal display quality and a rendering ability that correspond to a network load changing moment to moment in a screen transfer system thin client.

Further, Patent Literature 4 describes a client device that enables a thin client terminal to store image data downloaded from a server device with sufficient image quality and browse the image data offline.

PTL 1:
Japanese Patent Kokai Publication No. JP2007-310508A
PTL 2:
Japanese Patent Kohyo Publication No. JP2006-521029A
PTL 3:
Japanese Patent Kokai Publication No. JP2008-234389A
PTL 4:
Japanese Patent Kokai Publication No. JP2009-246758A

SUMMARY

Each disclosure of Patent Literatures listed above is incorporated herein in its entirety by reference thereto. The following analysis is given by the present inventor.

When an operator tries to introduce a new service based on the framework of conventional services, sometimes an existing mobile terminal cannot be supported. In such a case, in order to take advantage of the new service, a new mobile terminal must be purchased or the old terminal must be modified at the start of the new service.

Further, when contents/content files such as still images or especially videos are stored in a mobile terminal, it may not be able to store these files due to restriction in the memory amount of the mobile terminal as the resolution of these files is improved and the file size increases.

Further, in a case where an end user stores contents/content files in his own mobile terminal, these files can be destroyed due to malfunctioning of the mobile terminal, or he will no longer be able to access these files if he loses the mobile terminal by leaving it somewhere or having it stolen.

Therefore, there is a need in the art to provide a remote mobile communication system, server device, and remote mobile communication system control method that make it possible to use contents without changing the mobile terminal when the size of the contents increases in a mobile network.

A server device relating to a first aspect of the present disclosure comprises:
a storage unit that, upon receiving content storage instruction information from a mobile terminal via a packet forwarding device in
a mobile network and a content stream or content file, stores the content stream or content file;
a virtual client unit that, upon receiving content reproduction instruction information from the mobile terminal, reads, decodes and reproduces a content stream or content file stored in the storage unit to generate display screen data; and
an encoder unit that transmits an encoding result obtained by compression-encoding part or all of the display screen data as a packet to the packet forwarding device.

A remote mobile communication system relating to a second aspect of the present disclosure comprises the server device relating to the first aspect.

A remote mobile communication system control method relating to a third aspect of the present disclosure comprises:
by a server device in a mobile network, receiving content storage instruction information from a mobile terminal via a packet forwarding device in the mobile network and a content stream or content file, and storing the content stream or content file in a storage unit of the server device;
receiving content reproduction instruction information from the mobile terminal, reading, decoding and reproducing a content stream or content file stored in the storage unit to generate a display screen data; and
transmitting an encoding result obtained by compression-encoding part or all of the display screen data as a packet to the packet forwarding device.

The present disclosure provides the following advantage, but not restricted thereto. According to the remote mobile communication system, the server device, and the remote mobile communication system control method relating to the present disclosure, it is possible to use contents without changing mobile terminals, even if the amount of contents on the mobile network increases.

PREFERRED MODES

Figure 1:
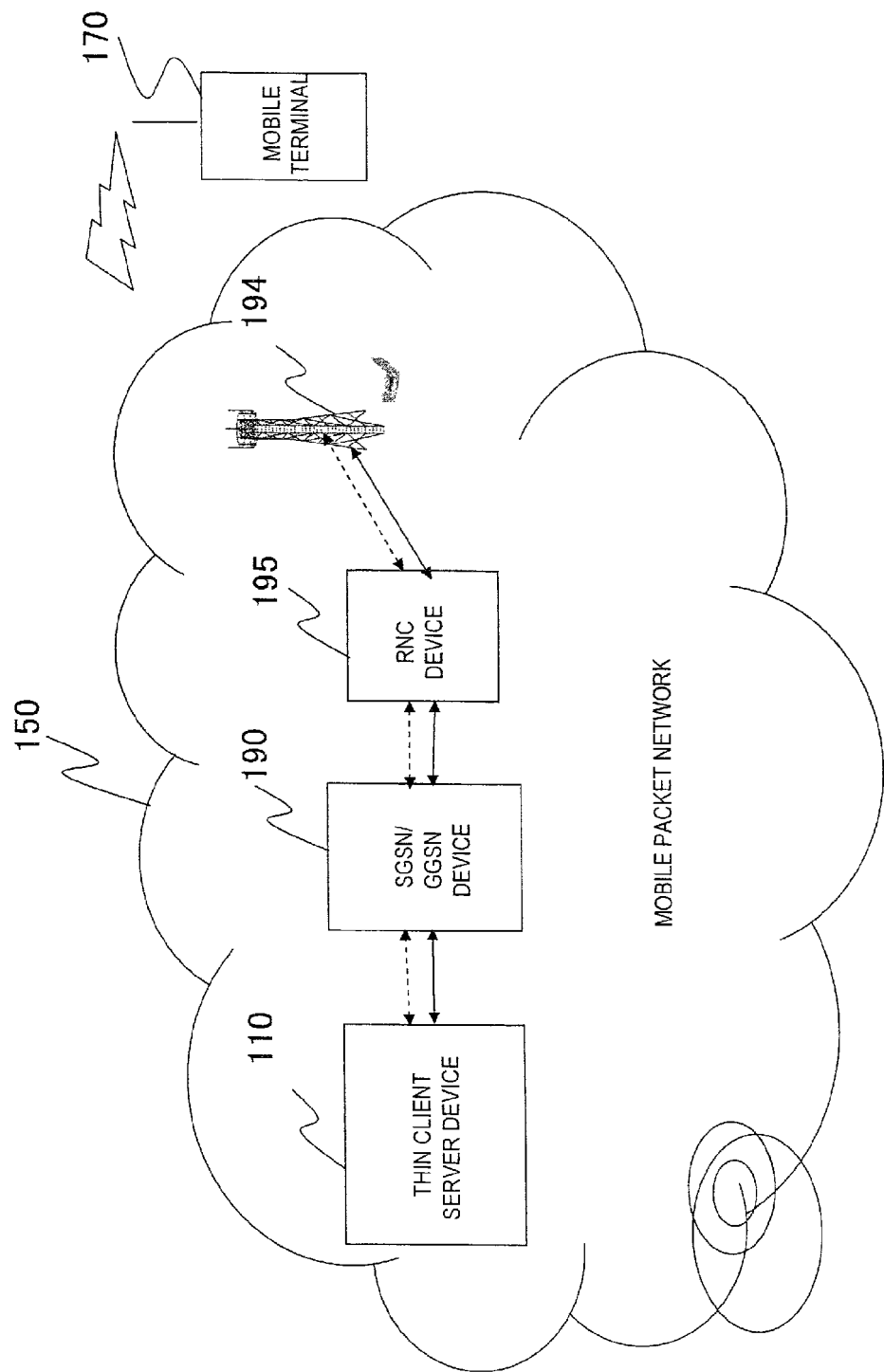
FIG. 1 is a drawing showing a connection configuration of devices in a remote mobile communication system relating to a first exemplary embodiment.

In the present disclosure, there are various possible modes, which include the following, but not restricted thereto. A server device according to a first mode may be server device relating to the first aspect.

A server device according to a second mode may further comprise a rate control unit that measures a frequency of retransmission requests received from the mobile terminal for the transmitted packet, and controls at least one of a bit rate and a frame rate for the compression encoding performed by the encoder unit based on the measurement.

In a server device according to a third mode, the rate control unit may decrease a maximum bit rate or maximum frame rate for the compression encoding performed by the encoder unit when a number of retransmission requests received within a predetermined period of time is not less than a predetermined threshold value.

In a server device according to a fourth mode, the rate control unit may retransmit a corresponding packet when receiving a retransmission request from the mobile terminal.

In a server device according to a fifth mode, the encoder unit may packetize the encoding results and transmit the packet to the packet forwarding device using a UDP protocol.

A remote mobile communication system according to a sixth mode may be the remote mobile communication system relating to the second aspect.

A remote mobile communication system according to a seventh mode may further comprise a mobile terminal that receives a packet transmitted from the server device via the packet forwarding device, and decodes and displays an encoding result stored in the packet.

In a remote mobile communication system according to an eighth mode, the mobile network may be a mobile packet network or mobile LTE (Long Term Evolution)/EPC (Evolved Packet Core) network.

A remote mobile communication system control method according to a ninth mode may be the remote mobile communication system control method relating to the third aspect.

A remote mobile communication system control method according to a tenth mode may further comprise measuring a frequency of retransmission requests received from the mobile terminal for the transmitted packet, and controlling at least one of a bit rate and a frame rate for the compression encoding based on the measurement.

According to the present disclosure, it is possible for an operator to introduce a new service by updating an application software program on the server provided in the network. This eliminates the necessity of obtaining a new mobile terminal or modifying the existing mobile terminal each time a new service is introduced.

Further, according to the present disclosure, it is possible store contents and content files such as image files and especially videos in the storage unit (a storage device such as a cache memory or hard disk) provided in the server device on the network by means of the same operation as that of storing the contents on the mobile terminal. As a result, when the contents or content files are destroyed due to malfunctioning of the mobile terminal or the mobile terminal is lost or stolen, the user will not lose the contents or content files and will still be able to access them.

Further, according to the present disclosure, when the stored contents are reproduced or browsed, it is possible to have the server device measure the number of packet retransmission requests in a case of using the UDP/IP protocol at the time of or during a call connection and control the maximum bit rate for screen information compression/encoding according to the measurement results depending on fluctuations in the bandwidth of the mobile packet network or LTE/EPC network. As a result, a decrease in QoE due to the slow reception of information and slow screen updates on the mobile terminal can be avoided.

First Exemplary Embodiment

A remote mobile communication system relating to a first exemplary embodiment will be described in detail with reference to the drawings.

FIG. 1 shows a connection configuration of devices in the remote mobile communication system relating to the present exemplary embodiment.

FIG. 1 shows a configuration in which a 3G mobile packet network 150 is used as a mobile network and an SGSN/GGSN (xGSN) device 190 is used as a packet forwarding device. Here, the SGSN/GGSN device 190 is a device in which a SGSN (Serving GPRS Support Node) device and a GGSN (Gateway GPRS Support Node) device are integrated.

Further, FIG. 1 shows a configuration in a case where a service in which an end user stores contents/content files such as still images/videos and audio recorded using the camera of a mobile terminal in a cache memory or storage device of a virtual client on a server over the mobile network as if to store them in the mobile terminal and then displays the contents stored in the cache memory or the storage device of the virtual client on the server on the mobile terminal as if to reproduce and display contents stored in the mobile terminal is provided as an example of a service. Further, based on the same configuration, this service can be provided in cases of games, applications, etc., in addition to contents.

With reference to FIG. 1, in order to store contents in a virtual client possessed by a thin client server device 110 disposed over the mobile packet network 150, a mobile terminal 170 sends an instruction signal for storing to the thin client server device 110 via a base station 194, an RNC (Radio Network Controller) device 195, and the SGSN/GGSN device 190.

Here, the instruction signal is a signal sent by the mobile terminal 170 when a user performs a key-pressing operation or special character (for instance, "*," and "#") input operation on the mobile terminal 170.

The instruction signal sent by the mobile terminal 170 reaches the base station 194, the RNC device 195, the SGSN/GGSN device 190, and the thin client server device 110 provided over the mobile packet network 150, in this order. As a result, the thin client server device 110 receives the instruction signal from the mobile terminal 170.

Publicly known protocols can be used as a protocol for sending the instruction signal. Here, as an example, TCP/IP and HTTP as an upper layer protocol thereof are used. Further, in addition to HTTP, SIP (Session Initiation Protocol) may be used as well.

Figure 2:
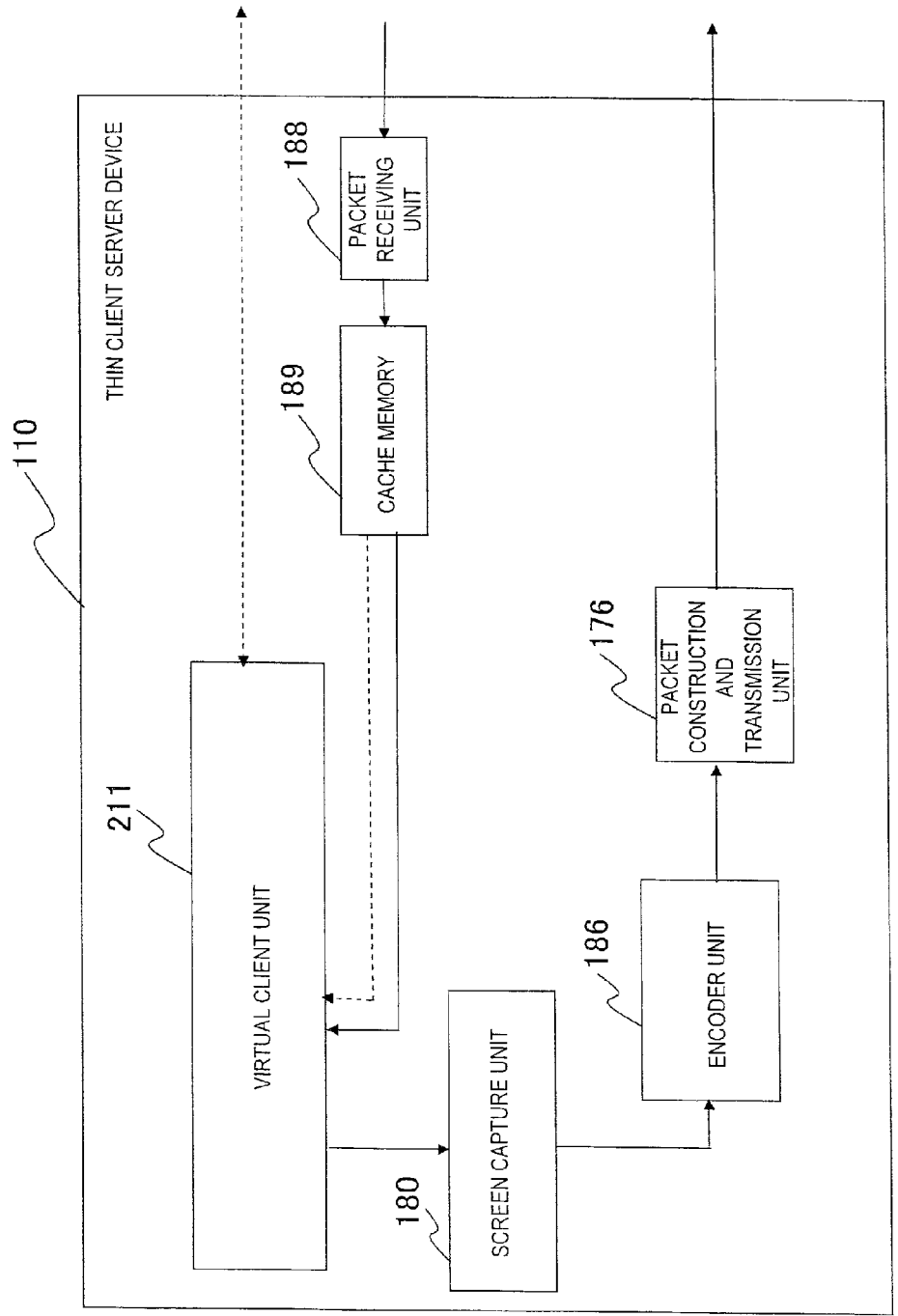
FIG. 2 is a block diagram showing a configuration of a thin client server device in the remote mobile communication system relating to the first exemplary embodiment.

FIG. 2 is a block diagram showing the configuration of the thin client server device 110. With reference to FIG. 2, the thin client server device 110 comprises a virtual client unit 211, a screen capture unit 180, an encoder unit 186, a packet construction and transmission unit 176, a cache memory (storage unit) 189, and a packet receiving unit 188.

The virtual client unit 211 comprises application software that supports a new service, an audio/still image/video decoder, and a screen generating unit (not shown in the drawing). The application software can be changed easily from the outside of the thin client server device 110.

The virtual client unit 211 receives a TCP packet from the mobile terminal 170 as the storage instruction signal via the base station 194, the RNC device 195, and the SGSN/GGSN device 190. The virtual client unit 211 analyzes the HTTP on the received TCP packet and recognizes to perform an operation of storing contents in the thin client server device 110.

In the content storing operation, the virtual client unit 211 executes the application for storing contents according to the instruction signal from the mobile terminal, generates an application screen showing an operation content, and outputs the result to the screen capture unit 180.

The screen capture unit 180 captures the screen, converts it into image luminance and color-difference signals, and outputs them to the encoder unit 186. Note that other formats, for instance a YUV format, may be used.

The encoder unit 186 receives an image signal or still image signal of a predetermined fps value (frames per second) as a screen signal from the screen capture unit 180. Further, using a predetermined compression method, the encoder unit 186 compresses and encodes the image signal outputted from the screen capture unit 180 without exceeding a predetermined maximum bit rate, generates a compressed encoded bit stream, and sends the bit stream to the packet construction and transmission unit 176.

In the present exemplary embodiment, for instance, a compression encoding method based on Wavelet, effective for compression-encoding a screen having both a still image and video, is used. Further, other known compression encoding methods may be employed.

The packet construction and transmission unit 176 stores the compressed encoded bit stream in the payload of a packet and sends the packet to the SGSN/GGSN device 190 using the TCP/IP protocol. Here, the compressed encoded bit stream may be temporarily stored in a file, and this file may be sent in a packet.

With reference to FIG. 1, the mobile terminal 170 receives the packet sent by the thin client server device 110 via the SGSN/GGSN device 190, and displays a screen obtained by decoding the compressed encoded bit stream stored in the payload of the packet using a decoder that corresponds to the encoder unit 186 in the thin client server device 110. Further, the mobile terminal 170 starts to store a content stream or content file in the thin client server device 110.

With reference to FIG. 2, the packet receiving unit 188 receives a packet storing the content stream or content file to be stored from the mobile terminal 170, extracts the content stream or content file from the payload of the packet, and stores it in the cache memory 189.

At the completion of storing the content stream or content file, the cache memory 189 notifies the virtual client unit 211 of the completion.

Upon receiving the completion notification, the virtual client unit 211 generates a screen indicating the storing has ended, and outputs the screen to the screen capture unit 180.

The screen capture unit 180 captures the screen.

The encoder unit 186 encodes the captured screen, and outputs the encoded result to the packet construction and transmission unit 176.

The packet construction and transmission unit 176 constructs TCP/IP packets, and outputs the packet to the SGSN/GGSN device 190.

The mobile terminal 170 receives these packets.

Next, the operation of reproducing a content will be described. Upon receiving content reproduction instruction information from the mobile terminal 170 via the SGSN/GGSN device 190, the virtual client unit 211 reads a corresponding content stream or file from contents stored in the cache memory 189, decodes the content stream or file using a decoding method that corresponds to the compression encoding method used by the mobile terminal 170, generates and reproduces a display screen, and outputs the result to the screen capture unit 180.

The screen capture unit 180 captures the screen, converts the screen into image luminance and color-difference signals, and output them to the encoder unit 186. Here, note that other formats, for instance a YUV format, may be used.

The encoder unit 186 receives an image signal or still image signal of a predetermined fps value (frames per second) as a screen signal from the screen capture unit 180. Further, using a predetermined compression method, the encoder unit 186 compresses and encodes the image signal outputted from the screen capture unit 180 without exceeding a predetermined maximum bit rate, generates a compressed encoded bit stream, and sends the bit stream to the packet construction and transmission unit 176.

The packet construction and transmission unit 176 stores the compressed encoded bit stream in the payload of a packet and sends the packet to the SGSN/GGSN device 190 using the TCP/IP protocol. Here, the compressed encoded bit stream may be temporarily stored in a file, and this file may be sent in a TCP/IP packet.

The SGSN/GGSN device 190 encapsulates the received TCP/IP packet using the GTP-U protocol and forwards it to the RNC device 195.

The RNC device 195 wirelessly sends the packet to the mobile terminal 170 via the base station 194.

The mobile terminal 170 receives the packet according to the TCP/IP protocol, and takes out the compressed encoded stream or file stored in the payload of the packet. The mobile terminal 170 possesses a decoder that corresponds to the encoder unit 186 of the thin client server device 110 and decodes the compressed encoded stream (or decodes the stream stored in the file after taking it out from the file) using this decoder, and displays the screen obtained by decoding the stream on a display of the mobile terminal 170.

Various modifications to the configuration shown in FIG. 2 are possible. In FIG. 2, as contents that the mobile terminal 170 stores, in addition to still images and videos, various contents such as music/audio, files, and programs can be stored. Further, the SGSN/GGSN device 190 may be provided being separated into an SGSN device and a GGSN device. Further, instead of the cache memory 189 as a storage unit in the thin client server device 110, a storage device such as a hard disk can be used.

Second Exemplary Embodiment

A remote mobile communication system relating to a second exemplary embodiment will be described in detail with reference to the drawings.

In the first exemplary embodiment, the TCP/IP protocol is used as the protocol for the packet sent from the thin client server device 110 to the SGSN/GGSN device 190. In the present exemplary embodiment, the UDP/IP protocol is used instead of the TCP/IP protocol.

By using the UDP/IP protocol, the forward delay time in the mobile network can be reduced, compared to the case where the TCP/IP protocol is used. On the other hand, when the UDP/IP protocol is used, a countermeasure against packet loss is required.

Here, a configuration in which the mobile terminal determines whether or not a packet loss has occurred, and when a packet loss has occurred, the mobile terminal requests the thin client server device to resend the packet will be described.

Figure 3:
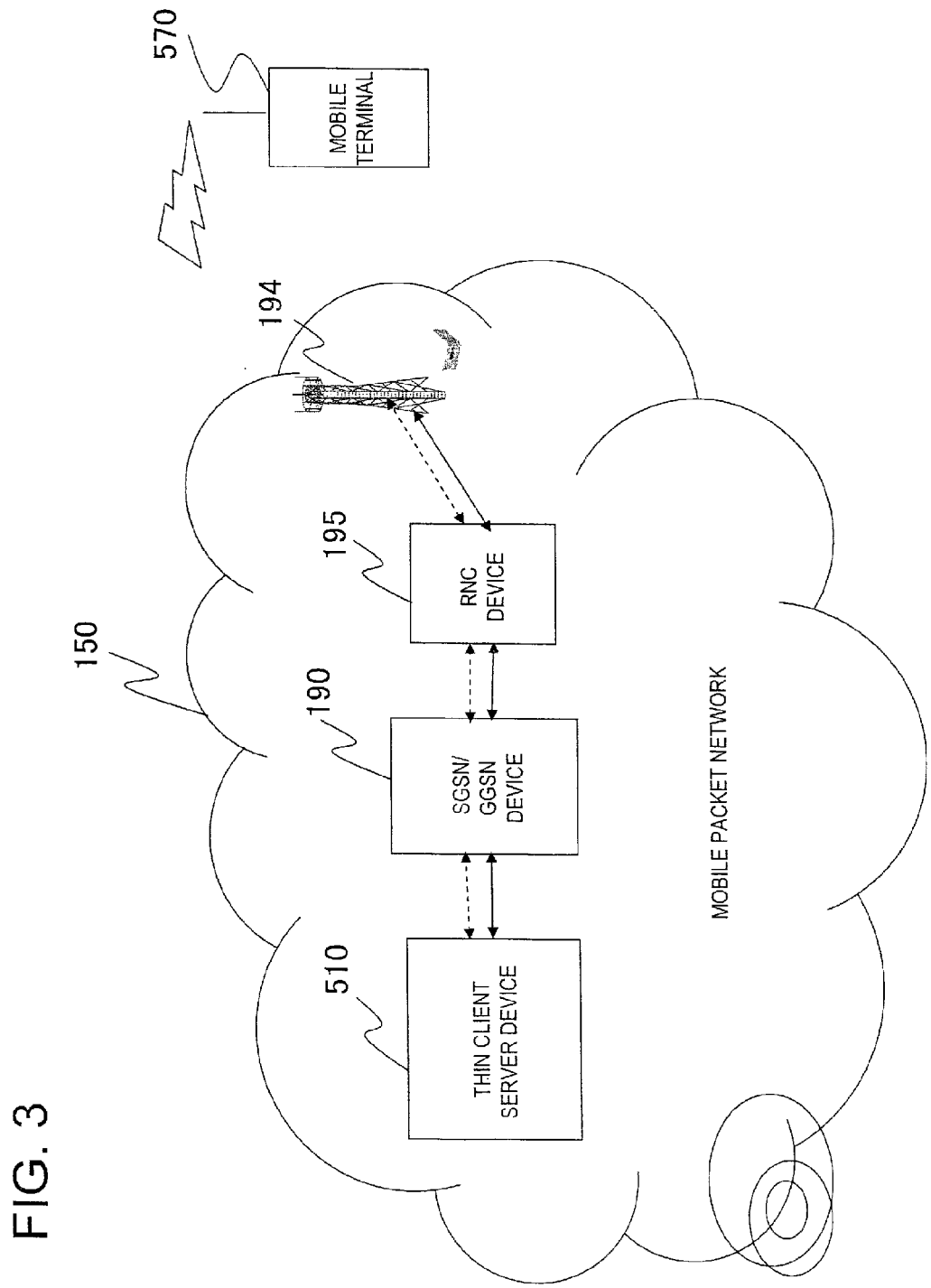
FIG. 3 is a drawing showing a connection configuration of devices in a remote mobile communication system relating to a second exemplary embodiment.

FIG. 3 is a drawing showing a connection configuration of devices in the remote mobile communication system relating to the present exemplary embodiment. In FIG. 3, the operations of the components given the same signs as the components in FIG. 1 are the same as the operations of the components in FIG. 1; therefore, explanation of them will be omitted.

The configuration shown in FIG. 3 differs from the configuration shown in FIG. 1 in the following three points. (1) A thin client server device 510 sends a UDP/IP packet to the SGSN/GGSN device 190. (2) Proprietary or generic sequence numbers are given to UDP packets. (3) A mobile terminal 570 receives a UDP/IP packet sent by the thin client server device 570 via the SGSN/GGSN device 190, the RNC device 195, and the base station 194.

The mobile terminal 570 checks the proprietary or generic sequence number added to a UDP/IP packet and confirms whether or not there is a UDP packet loss. When the sequence numbers are continuous and there is no packet loss, the mobile terminal 570 extracts a bit stream or file stored in the payload of the UDP packet, decodes it, and displays it on a display of the mobile terminal 570. Meanwhile, when the sequence numbers skip (are discontinuous) and a packet loss is deemed to have occurred, the mobile terminal 570 requests the thin client server device 510 to resend the lost packet.

Figure 4:
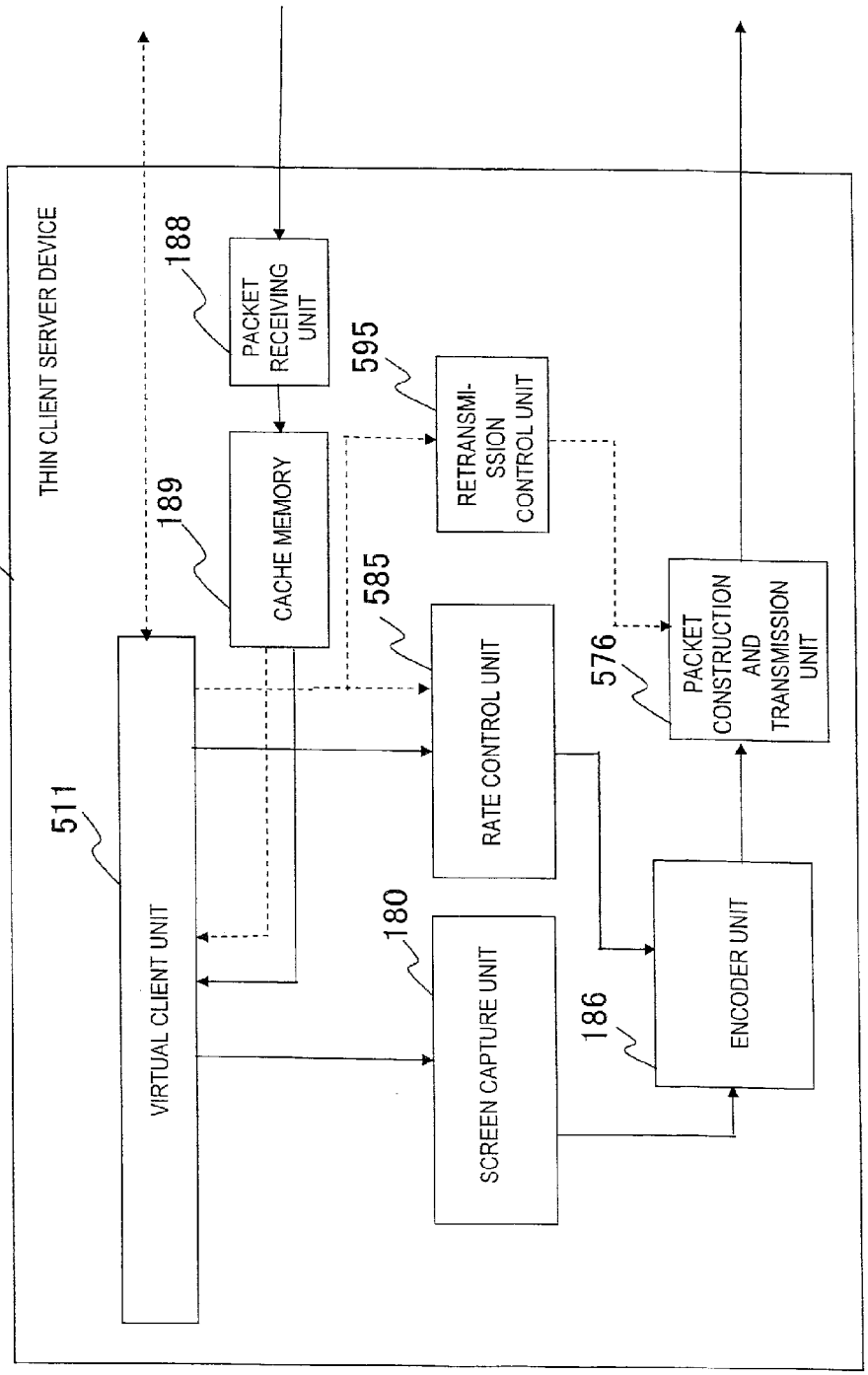
FIG. 4 is a block diagram showing a configuration of a thin client server device in the remote mobile communication system relating to the second exemplary embodiment.

FIG. 4 is a block diagram showing the configuration of the thin client server device 510. In FIG. 4, the operations of the components given the same signs as the components in FIG. 2 are the same as the operations of the components in FIG. 2; therefore, explanation of them will be omitted.

With reference to FIG. 4, a packet construction and transmission unit 576 stores a bit stream compressed and encoded by the encoder unit 186 in the payload of a UDP packet, adds a proprietary or generic sequence number thereto, and sends the packet to the SGSN/GGSN device 190 using the UDP/IP protocol.

The packet construction and transmission unit 576 may temporarily store the compressed encoded bit stream in a file, and send the file in a packet. In this case, for instance, the UDP/IP protocol may be used as the packet protocol.

A retransmission control unit 595 receives a retransmission request signal from a virtual client unit 511 via the SGSN/GGSN device 190 when the mobile terminal 570 requests a retransmission. The retransmission control unit 595 derives a sequence number from the retransmission request instruction, and outputs the derived sequence number to the packet construction and transmission unit 576.

Following the instruction from the retransmission control unit 595, the packet construction and transmission unit 576 resends the UDP/IP packet of the corresponding sequence number to the SGSN/GGSN device 190.

A rate control unit 585 counts the number of retransmission request instructions received from the virtual client unit 511 within a predetermined period of time, and derives a cumulative value C accumulated within a predetermined time interval. Further, the rate control unit 585 controls a maximum bit rate Emax in the encoder unit 186 by comparing the derived cumulative value C to a predetermined threshold value Th2.

$$C \geq Th2 \quad (1)$$

When Math. 1 holds, the rate control unit 585 reduces the maximum bit rate Emax as in Math. 2.

$$Emax = Emax - \Delta 3 \quad (2)$$

In Math. 2, $\Delta 3$ is a predetermined constant.

Meanwhile, when the value of the cumulative value C is less than the threshold value Th2, the rate control unit 585 restores the maximum bit rate Emax to an initial value.

The rate control unit 585 outputs the maximum bit rate Emax derived as described to the encoder unit 186.

In FIG. 4, the maximum bit rate is controlled. The same configuration as FIG. 4 can be applied to controlling a frame rate.

Further, as contents that the mobile terminal stores, in addition to still images and videos, various contents such as music/audio, files, and programs can be stored. Further, the SGSN/GGSN device 190 may be provided being separated into an SGSN device and a GGSN device. Further, instead of the cache memory 189 as a storage unit in the thin client server device 510, a storage device such as a hard disk can be used.

Third Exemplary Embodiment

A remote mobile communication system relating to a third exemplary embodiment will be described in detail with reference to the drawings.

Figure 5:
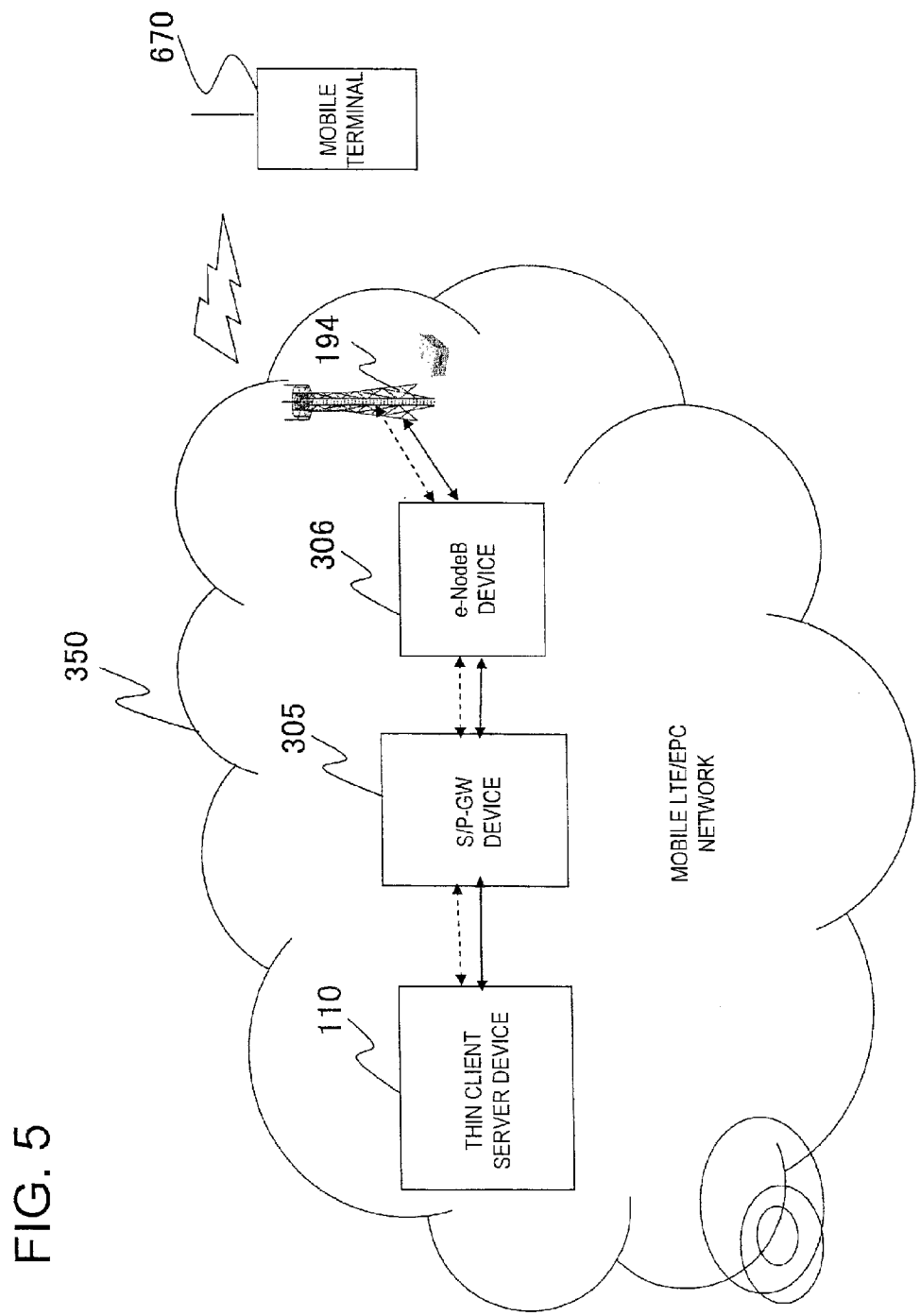
FIG. 5 is a drawing showing a connection configuration of devices in a remote mobile communication system relating to a third exemplary embodiment.

FIG. 5 is a drawing showing a connection configuration of devices in the remote mobile communication system relating to the present exemplary embodiment. With reference to FIG. 5, the remote mobile communication system comprises the thin client server device 110, an S/P-GW device 305, an e-NodeB (enhanced-NodeB) device 306, the base station 194, and a mobile terminal 670.

In FIG. 5, operations of the components given the same signs as the components in FIG. 1 are the same as the operations of the components in FIG. 1; therefore, explanation of them will be omitted.

The configuration shown in FIG. 5 differs from the configuration shown in FIG. 1 in that the mobile terminal 670 connects to the thin client server device 110 via a mobile LTE/EPC network 350 and through the e-NodeB device 306 and the S/P-GW device 305. According to the configuration shown in FIG. 5, a packet can be forwarded much faster than the configuration based on the mobile packet network 150 shown in FIG. 1.

Using the LTE technology, the e-NodeB device 306 achieves a much faster packet transmission in a wireless zone between itself and the mobile terminal 670, compared to the conventional technologies. Further, since the S/P-GW device 305 and the thin client server device 110 are connected by the IP protocol, the thin client server device 110 shown in FIG. 1 can be used as it is even in the case where the thin client server device 110 is connected to the S/P-GW device.

From the thin client server device 110, the S/P-GW device 305 receives a packet according to the TCP/IP or UDP/IP protocol or receives a file forwarded according to these protocols, converts the packet or file into the GTP-U (GPRS Tunneling Protocol-User Plane)/TCP/IP or the GTP-U/UDP/IP protocol, and outputs a compressed encoded bit stream or file to the e-NodeB device 306.

The e-NodeB device 306 converts the bit stream or file into the PDCP/RLC protocol, and sends the packet or file to the mobile terminal 670.

As contents that the mobile terminal stores, in addition to still images and videos, various contents such as music/audio, files, and programs can be stored. Further, an S-GW device and a P-GW device are integrated into the S/P-GW device 305 in this configuration, however, a configuration in which the S-GW device and the P-GW device are separated can be employed as well.

As the instruction signal from the mobile terminal, the publicly known SIP (Session Initiation Protocol) can be used in all the exemplary embodiments described above.

According to the exemplary embodiments above, it is possible for an operator to introduce a new service by updating an application software program on the thin client server provided in the network. This eliminates the necessity of obtaining a new mobile terminal or modifying the existing mobile terminal each time a new service is introduced.

Further, according to the exemplary embodiments above, it is possible store contents and content files such as image files and especially videos in the cache memory (or a storage device such as a hard disk) provided in the thin client server device on the network by means of the same operation as that of storing the contents on the mobile terminal. As a result, when the contents or content files are destroyed due to malfunctioning of the mobile terminal or the mobile terminal is lost or stolen, the user will not lose the contents or content files and will still be able to access them.

Further, according to the exemplary embodiments above, when the stored contents are reproduced or browsed, it is possible to have the thin client server device measure the number of packet retransmission requests in the case of using the UDP/IP protocol at the time of or during a call connection and control the maximum bit rate for screen information compression/encoding according to the measurement results depending on fluctuations in the bandwidth of the mobile packet network or LTE/EPC network. As a result, a decrease in QoE due to the slow reception of information and slow screen updates on the mobile terminal can be avoided.

The disclosure of the above Patent Literatures is incorporated herein by reference thereto. Modifications and adjustments of the exemplary embodiment are possible within the scope of the overall disclosure (including the claims) of the present invention and based on the basic technical concept of the present invention. Various combinations and selections of various disclosed elements (including each element of each claim, each element of each exemplary embodiment, each element of each drawing, etc.) are possible within the scope of the claims of the present invention. That is, the present invention of course includes various variations and modifications that could be made by those skilled in the art according to the overall disclosure including the claims and the technical concept. Particularly, any numerical range disclosed herein should be interpreted that any intermediate values or subranges falling within the disclosed range are also concretely disclosed even without specific recital thereof.

Further, part or all of the exemplary embodiments above can be described as the following supplementary notes without being limited thereto.

(Supplementary Note 1)

A server device, comprising:

a storage unit that, upon receiving content storage instruction information from a mobile terminal via a packet forwarding device in a mobile network and a content stream or content file, stores the content stream or content file;

a virtual client unit that, upon receiving content reproduction instruction information from the mobile terminal, reads, decodes and reproduces a content stream or content file stored in the storage unit to generate display screen data; and an encoder unit that transmits an encoding result obtained by compression-encoding part or all of the display screen data as a packet to the packet forwarding device.

(Supplementary Note 2)

The server device according to supplementary note 1, further comprising:

a rate control unit that measures a frequency of retransmission requests received from the mobile terminal for the transmitted packet, and controls at least one of a bit rate and a frame rate for the compression encoding performed by the encoder unit based on the measurement.

(Supplementary Note 3)

The server device according to supplementary note 2, wherein the rate control unit decreases a maximum bit rate or maximum frame rate for the compression encoding performed by the encoder unit when a number of retransmission requests received within a predetermined period of time is not less than a predetermined threshold value.

(Supplementary Note 4)

The server device according to supplementary note 2 or 3, wherein the rate control unit retransmits a corresponding packet when receiving a retransmission request from the mobile terminal.

(Supplementary Note 5)

The server device according to any one of supplementary notes 2 to 4, wherein
the encoder unit packetizes the encoding results and transmits the packet to the packet forwarding device using a UDP protocol.

(Supplementary Note 6)

A remote mobile communication system, comprising the server device according to any one of supplementary notes 1 to 5.

(Supplementary Note 7)

The remote mobile communication system according to supplementary note 6, further comprising:

a mobile terminal that receives a packet transmitted from the server device via the packet forwarding device, and decodes and displays an encoding result stored in the packet.

(Supplementary Note 8)

The remote mobile communication system according to supplementary note 6 or 7, wherein
the mobile network is a mobile packet network or mobile LTE (Long Term Evolution)/EPC (Evolved Packet Core) network.

(Supplementary Note 9)

A remote mobile communication system control method, comprising:

by a server device in a mobile network, receiving content storage instruction information from a mobile terminal via a packet forwarding device in the mobile network and a content stream or content file, and storing the content stream or content file in a storage unit of the server device;

receiving content reproduction instruction information from the mobile terminal, reading, decoding and reproducing a content stream or content file stored in the storage unit to generate a display screen data; and transmitting an encoding result obtained by compression-encoding part or all of the display screen data as a packet to the packet forwarding device.

(Supplementary Note 10)

The remote mobile communication system control method according to supplementary note 9, further comprising:

measuring a frequency of retransmission requests received from the mobile terminal for the transmitted packet, and controlling at least one of a bit rate and a frame rate for the compression encoding based on the measurement.

(Supplementary Note 11)

The remote mobile communication system control method according to supplementary note 10, comprising:

decreasing a maximum bit rate or maximum frame rate for the compression encoding when a number of retransmission requests received within a predetermined period of time is not less than a predetermined threshold value.

(Supplementary Note 12)

The remote mobile communication system control method according to supplementary note 10 or 11, comprising:
retransmitting a corresponding packet when receiving a retransmission request from the mobile terminal.

REFERENCE SIGNS LIST 110, 510: thin client server device (server device)
150: mobile packet network
170, 570, 670: mobile terminal
176, 576: packet construction and transmission unit
180: screen capture unit
186: encoder unit
188: packet receiving unit
189: cache memory (storage unit)
190: SGSN/GGSN (xGSN) device
194: base station
195: RNC device
211, 511: virtual client unit
305: S/P-GW device
306: e-NodeB device
350: mobile LTE/EPC network
585: rate control unit
595: retransmission control unit

The invention claimed is:

1. A server device, comprising:
   a storage unit that, upon receiving content storage instruction information from a mobile terminal via a packet forwarding device in a mobile network and a content stream or content file, stores the content stream or content file;
   a virtual client unit that, upon receiving content reproduction instruction information from the mobile terminal, reads, decodes and reproduces a content stream or content file stored in the storage unit to generate display screen data;
   an encoder unit that transmits an encoding result obtained by compression-encoding part or all of the display screen data as a packet to the packet forwarding device; and
   a rate control unit that measures a frequency of retransmission requests received from the mobile terminal for the transmitted packet, and controls at least one of a bit rate and a frame rate for the compression encoding performed by the encoder unit based on the measurement.

2. The server device according to claim 1, wherein
   the rate control unit decreases a maximum bit rate or maximum frame rate for the compression encoding performed by the encoder unit when a number of retransmission requests received within a predetermined period of time is not less than a predetermined threshold value.

3. The server device according to claim 2, wherein
   the rate control unit retransmits a corresponding packet when receiving a retransmission request from the mobile terminal.

4. The server device according to claim 2, wherein
   the encoder unit packetizes the encoding results and transmits the packet to the packet forwarding device using a UDP protocol.

5. A remote mobile communication system, comprising the server device according to claim 2.

6. The server device according to claim 1, wherein
   the rate control unit retransmits a corresponding packet when receiving a retransmission request from the mobile terminal.

7. The server device according to claim 6, wherein
   the encoder unit packetizes the encoding results and transmits the packet to the packet forwarding device using a UDP protocol.

8. A remote mobile communication system, comprising the server device according to claim 6.

9. The server device according to claim 1, wherein
   the encoder unit packetizes the encoding results and transmits the packet to the packet forwarding device using a UDP protocol.

10. A remote mobile communication system, comprising the server device according to claim 9.

11. A remote mobile communication system, comprising the server device according to claim 1.

12. The remote mobile communication system according to claim 11, further comprising:
    a mobile terminal that receives a packet transmitted from the server device via the packet forwarding device, and decodes and displays an encoding result stored in the packet.

13. The remote mobile communication system according to claim 12, wherein
    the mobile network is a mobile packet network or mobile LTE (Long Term Evolution)/EPC (Evolved Packet Core) network.

14. The remote mobile communication system according to claim 11, wherein
    the mobile network is a mobile packet network or mobile LTE (Long Term Evolution)/EPC (Evolved Packet Core) network.

15. A remote mobile communication system control method, comprising:
    by a server device in a mobile network, receiving content storage instruction information from a mobile terminal via a packet forwarding device in the mobile network and a content stream or content file, and storing the content stream or content file in a storage unit of the server device;
    receiving content reproduction instruction information from the mobile terminal, reading, decoding and reproducing a content stream or content file stored in the storage unit to generate a display screen data;
    transmitting an encoding result obtained by compression-encoding part or all of the display screen data as a packet to the packet forwarding device; and
    measuring a frequency of retransmission requests received from the mobile terminal for the transmitted packet, and controlling at least one of a bit rate and a frame rate for the compression encoding based on the measurement.

16. The remote mobile communication system control method according to claim 15, further comprising:
    decreasing a maximum bit rate or maximum frame rate for the compression encoding when a number of retransmission requests received within a predetermined period of time is not less than a predetermined threshold value.

17. The remote mobile communication system control method according to claim 15, further comprising:
    retransmitting a corresponding packet when receiving a retransmission request from the mobile terminal.

* * * * *